United States Patent
Nakaike

(10) Patent No.: US 10,241,700 B2
(45) Date of Patent: Mar. 26, 2019

(54) EXECUTION OF PROGRAM REGION WITH TRANSACTIONAL MEMORY

(71) Applicant: INTERNATIONAL BUSINESS MACHINES CORPORATION, Armonk, NY (US)

(72) Inventor: Takuya Nakaike, Tokyo (JP)

(73) Assignee: International Business Machines Corporation, Armonk, NY (US)

(*) Notice: Subject to any disclaimer, the term of this patent is extended or adjusted under 35 U.S.C. 154(b) by 308 days.

(21) Appl. No.: 14/832,793

(22) Filed: Aug. 21, 2015

(65) Prior Publication Data

US 2017/0052726 A1 Feb. 23, 2017

(51) Int. Cl.
*G06F 12/00* (2006.01)
*G06F 3/06* (2006.01)
*G06F 9/46* (2006.01)
*H04L 12/413* (2006.01)

(52) U.S. Cl.
CPC .......... *G06F 3/0622* (2013.01); *G06F 3/0653* (2013.01); *G06F 3/0683* (2013.01); *G06F 9/467* (2013.01); *H04L 12/413* (2013.01)

(58) Field of Classification Search
CPC ...... G06F 3/0653; G06F 3/0683; G06F 9/467; H04L 12/413
USPC ............................ 711/150; 710/200; 718/102
See application file for complete search history.

(56) References Cited

U.S. PATENT DOCUMENTS

| 7,836,280 | B1* | 11/2010 | Tene ..................... G06F 9/3001 712/216 |
| 8,037,476 | B1* | 10/2011 | Shavit ..................... G06F 9/526 711/150 |
| 8,078,653 | B1* | 12/2011 | Bisson .............. G06F 17/30864 707/641 |
| 8,458,721 | B2 | 6/2013 | Marathe et al. |
| 8,776,063 | B2 | 7/2014 | Dice et al. |
| 8,914,620 | B2 | 12/2014 | Dice |
| 2007/0162449 | A1* | 7/2007 | Manolov ........... G06F 17/30359 |

(Continued)

OTHER PUBLICATIONS

Diegues, N., et al., "Self-Tuning Intel Transactional Synchronization Extensions," Proceedings of the 11th International Conference on Autonomic Computing, Jun. 2014. (pp. 1-12).

(Continued)

*Primary Examiner* — Mardochee Chery
(74) *Attorney, Agent, or Firm* — Tutunjian & Bitetto; Vazken Alexanian

(57) ABSTRACT

A method for executing a program region by a computer system with transactional memory support is disclosed. The computer system uses hierarchical locks for executing the program region. Determination is conducted whether a first condition related to a transaction abort is satisfied in beginning a transaction for the program region. If the first condition is satisfied, a bottom level lock corresponding to a bottom level resource among available resources is acquired to execute the program region in the transaction. If a second condition is determined to be satisfied, a next level lock corresponding to next level resource is acquired. If the acquired lock is a top level lock corresponding to a top level resource, the program region is executed without using the transaction.

24 Claims, 9 Drawing Sheets

(56) References Cited

U.S. PATENT DOCUMENTS

| | | | | |
|---|---|---|---|---|
| 2011/0167421 | A1* | 7/2011 | Soundararajan | G06F 9/5077 718/1 |
| 2013/0290583 | A1* | 10/2013 | Dice | G06F 9/526 710/200 |
| 2013/0290967 | A1* | 10/2013 | Calciu | G06F 9/526 718/102 |
| 2013/0339959 | A1 | 12/2013 | Busaba et al. | |
| 2013/0339967 | A1* | 12/2013 | Greiner | G06F 9/467 718/102 |
| 2014/0040218 | A1 | 2/2014 | Kimura et al. | |
| 2015/0169357 | A1* | 6/2015 | Busaba | G06F 9/467 711/150 |
| 2016/0011915 | A1* | 1/2016 | Dice | G06F 9/466 718/102 |
| 2016/0070659 | A1* | 3/2016 | Pohlack | G06F 12/0857 711/122 |

OTHER PUBLICATIONS

Odaira, R., et al., "Eliminating Global Interpreter Locks in Ruby through Hardware Transactional Memory," Proceedings of the 19th ACM SIGPLAN symposium on Principles and practice of parallel programming, Feb. 2014. (pp. 131-142).

Wang, A., et al., "Evaluation of Blue Gene/Q Hardware Support for Transactional Memories," Proceedings of the 21st international conference on Parallel architectures and compilation techniques, Sep. 2012. (pp. 127-136).

* cited by examiner

```
1 :if (abort_ratio > T_core_lock) {         // Check the abort ratio
2 :  core_id = get_current_physical_core_id();  // Retrieve a physical-core ID
3 :  core_lock = &core_locks[core_id];      // Retrieve a core lock corresponding to the ID
4 :  acquire(core_lock);                    // Acquires the core lock
5 :  current_thread->core_lock = core_lock; // Store the core lock in a thread-local storage
6 :}
7 :tx_retry:                                //Label for retrying transaction
8 :tbegin();                                // Begin a transaction
9 :if (is_aborted()) {                      // Rollback point(return here upon transaction abort)
10:  if (retry_count > T_retry) {           // Fallback mechanism
11:    if (current_thread->core_lock != NULL) {
12:      release(current_thread->core_lock); // Release the core lock
13:      current_thread->core_lock = NULL;
14:    }
15:    acquire_global_lock();
16:  } else {
17:    retry_count++;
18:    goto tx_retry;
19:  }
20:}
21: // Transaction body
22:if (is_global_lock_acquire())
23:  release_global_lock();                 // Release the global lock
24:else {
25:  tend();                                // End the transaction
26:  if (current_thread->core_lock != NULL) {
27:    release(current_thread->core_lock);  // Release the core lock
28:    current_thread->core_lock = NULL;
29:  }
30:}
```

FIG. 6

EXECUTION OF PROGRAM REGION WITH TRANSACTIONAL MEMORY

BACKGROUND

Technical Field

The present invention, generally relates to execution of program codes, and more particularly, to execution of program regions with transactional memory support in computer systems.

Related Art

Transactional memory is a programming paradigm for concurrent computing. In such transactional memory programming environment, programmers can simply define program regions that may access shared variables as transactions by using machine instructions, by using compiler-provided programs or by using libraries.

Hardware transactional memory (HTM) is hardware implementation of the transactional memory. The HTM provides high concurrent performance by optimistically executing transactions in parallel. Processors with HTM keep track of memory loads and stores in hardware resources, such as caches, to detect data conflicts and buffer the memory stores during transactions. When the transaction aborts, the execution is rolled back to immediately after the beginning of the transaction or jumps to an abort handler. The transaction abort may occur due to data conflicts, resource conflicts or violations. The aborts that occur when the amount of memory access logs exceeds capacity of the hardware resources is called a capacity overflow abort.

Typical processors with HTM need a software fall back mechanism since the processors do not guarantee that the transactions eventually commit In general, the fall back mechanism uses a single global lock to support any critical sections in programs and to reduce complexity of programming.

For the purpose of reducing the transaction aborts, a self-tuning approach has been demonstrated, which exploits lightweight reinforcement learning techniques to identify optimal configuration in a workload oblivious manner with Intel® Transactional Synchronization Extensions (TSX) (N. Diegues et al. Self-Tuning Intel® Transactional Synchronization Extensions. The Proceedings of the 11 th International Conference on Autonomic Computing (ICAC '14). Jun. 18-20, 2014 Philadelphia. Pa.). By this approach, counters to control the number of retries before reverting to the global lock can be tuned by using the machine learning algorithm.

Some processors support simultaneous-multithreading (SMT), which allows multiple hardware threads to run on a single processor core concurrently. In such SMT environment, the transactions may encounter the capacity-overflow aborts before the amount of logs reaches the capacity of the hardware resource since the SMT threads share the hardware resources for conflict detection and store buffering in each core. If the transaction on the processor core reverts to the global lock due to the resource conflict between the SMT threads, the processor serializes the transactions on all threads including SMT threads on different cores. Such serialization diminishes degree of concurrency in the transactional memory executions. Since the above mentioned related art also employs the global lock, the situation remains unchanged, resulting in serialization of threads over different cores.

Thus, a method, associated computer system and computer program product are needed for executing program regions capable of reducing transaction aborts caused by resource conflicts and avoiding serializations of transactions beyond shared resources.

SUMMARY

The foregoing problems and shortcomings of conventional arts are addressed by the present invention, in which there are provided a method, computer system and computer program product for executing a program region with transactional memory support.

According to an embodiment of the present invention, there is provided a method for executing a program region by a computer system with transactional memory support. The method uses hierarchical locks, each of which is associated with a shared resource among available resources. The method comprises determining whether a first condition related to a transaction abort is satisfied in a beginning of a transaction for the program region. The method further comprises acquiring a bottom level lock corresponding to a bottom level resource among the available resources to execute the program region in the transaction if the first condition is satisfied. The method further comprises acquiring a next level lock corresponding to next level resource if a second condition is determined to be satisfied. The method further comprises executing the program region without using the transaction if the acquired lock is a top level lock corresponding to a top level resource.

By virtue of the method according to the embodiment of the present invention, the program region can be executed in the transaction with acquiring the bottom level lock that corresponds to the shared resource, thereby preventing occurrence of transaction aborts caused by resource conflicts, avoiding serializations of transactions beyond the shared resource, while ensuring that the execution of the program region succeeds eventually. The other abort condition such as data conflicts associated with different resources can be detected by the transactional memory support.

In a preferred embodiment according to the present invention, the hierarchical locks have one or more intermediate level locks between the top level lock and the bottom level lock. The method further comprises escalating a current level until reaching the top level where the top level lock is acquired. Therefore, the program regions may be executed in the transaction until the top level lock being acquired and extent of serialization can gradually extend, thereby minimizing the extent of serialization in accordance with the situation.

Computer systems and computer program products relating to one or more aspects of the present invention are also described and claimed herein.

Further, according to other embodiments of the present invention, there is provided a computer system for executing a program region with transactional memory support. The computer system includes hierarchical locks, each of which is associated with a shared resource among available resources. The computer system includes a transaction begin module configured to determine whether a first condition related to a transaction abort is satisfied in beginning a transaction for the program region. The transaction begin module is further configured to acquire a bottom level lock corresponding to a bottom level resource to execute the program region in the transaction if the first condition is satisfied. The transaction begin module is further configured to acquire a next level lock corresponding to next level resource if a second condition is determined to be satisfied.

The program region is executed without using the transaction if the acquired lock is a top level lock corresponding to a top level resource.

By virtue of the computer system according to one embodiment of the present invention, there is provided a set of modules capable of reducing occurrence of transaction aborts caused by resource conflicts and avoiding serialization of transactions beyond the shared resource. Therefore, programmers can simply define program regions that may access shared variables as transactions by using functions for the transaction begin and end modules.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter, which is regarded as the invention, is particularly pointed out and distinctly claimed in the claims at the conclusion of the specification. The forgoing and other features and advantages of the invention are apparent from the following detailed description taken in conjunction with the accompanying drawings in which:

FIG. 6 shows a pseudo-code of a computer program implementing a transaction retry and hierarchical lock mechanism according to second embodiment of the present invention;

DETAILED DESCRIPTION

Figure 1:
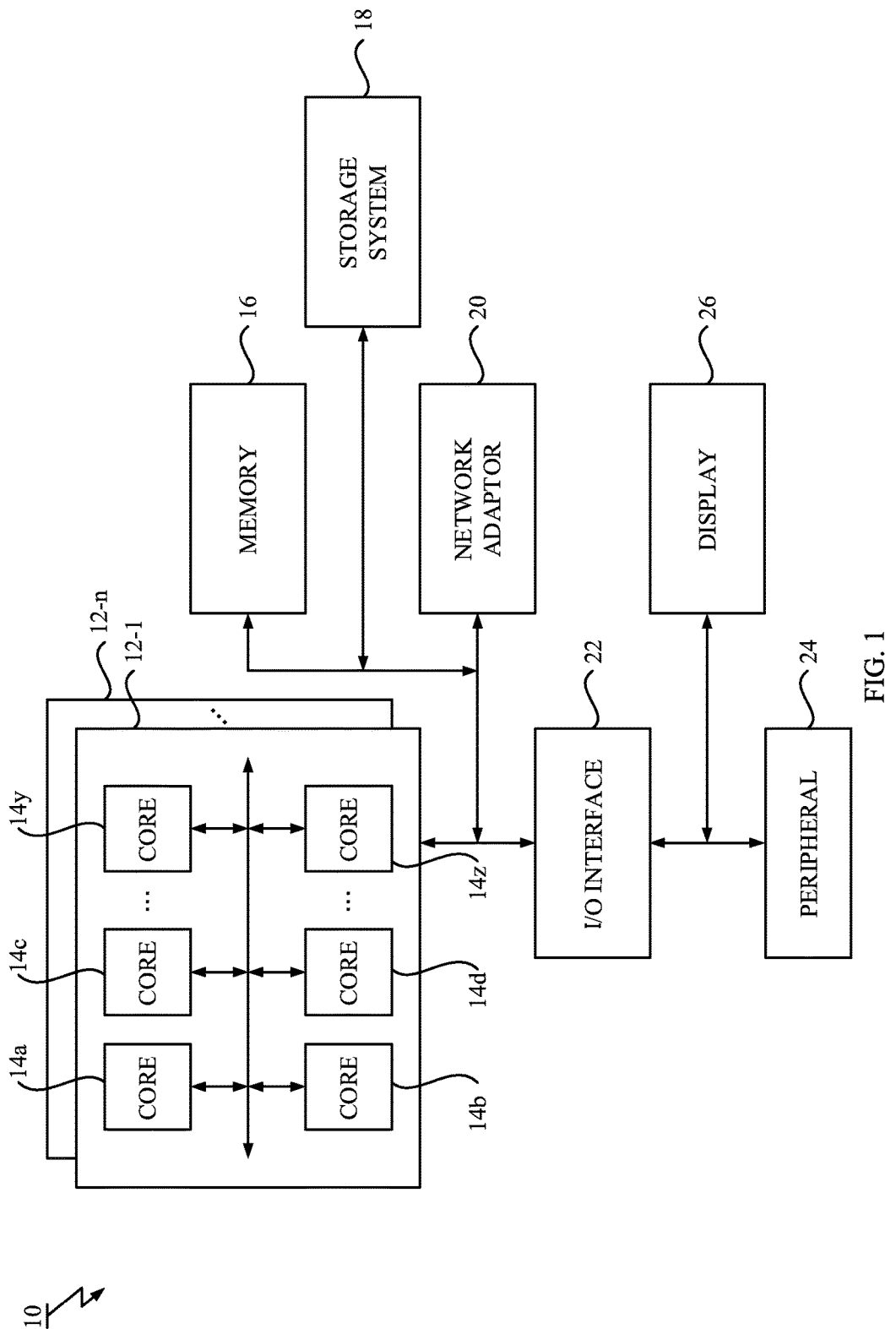
FIG. 1 depicts a computer system according to an exemplary embodiment of the present invention.

Now, the present invention will be described using particular embodiments, and the embodiments described hereafter are understood to be only referred as examples and are not intended to limit the scope of the present invention.

One or more embodiments according to the present invention are directed to methods, computer systems and computer program products for executing a program region with transactional memory support.

As described above, in a SMT environment, transactions may encounter capacity-overflow aborts before the amount of logs reach capacity of hardware resources since those SMT threads share the hardware resources for conflict detection and store buffering.

Therefore, there are needed a method, computer system and computer program product for executing program regions capable of reducing transaction aborts caused by such resource conflicts and avoiding serializations of transactions beyond the shared resource as possible.

In one or more embodiments according to the present invention, a novel transaction retry and lock mechanism is implemented in a computer system with transactional memory support, in which hierarchical locks each associated with a shared resource among available resources of the computer system are employed. In beginning a transaction for a program region, if a predetermined condition related to transaction aborts is satisfied, the computer system acquires a bottom level lock corresponding to a bottom level resource among the available resources to execute the program region in the transaction. The computer system can begin the transaction with the bottom level lock acquired so as to execute the program region in the transaction with the transactional memory support. In a particular embodiment, among threads sharing the associated resource, merely the thread acquiring the bottom lock is allowed for executing the transaction. On the other hand, other threads that do not share the corresponding resource can execute transactions concurrently. If another predetermined condition is determined to be satisfied, the computer system acquires a next level lock corresponding to next level resource. If the acquired lock is a top level lock corresponding to a top level resource, the computer system executes the program region without using the transaction.

If the top level lock is released, the computer system ends the transaction and may release the acquired lock upon ending the transaction. If the top level lock is acquired, the computer system releases the top level lock upon ending the executing of the program region.

If the transaction is aborted, the transaction is rolled back to the beginning of the transaction by the transactional memory support. When the transaction aborts, if the other predetermined condition related to the transaction is not satisfied, the computer system retries the transaction.

By virtue of the novel transaction retry and lock mechanism, the program region can be executed in the transaction with acquiring the lock corresponding to the shared resource. Hence, occurrence of serializations over the computer system can be reduced while ensuring that the execution of the program region succeeds eventually. Furthermore, occurrence of transaction aborts caused by resource conflicts can be reduced and serializations of transactions beyond the shared resource can be avoided as possible.

Referring now to FIG. 1, a schematic of an example of a computer system is shown. The computer system 10 is only one example of a suitable computer system and is not intended to suggest any limitation as to the scope of use or functionality of embodiments of the invention described herein. Regardless, the computer system 10 is capable of being implemented and/or performing any of the functionality set forth hereinabove.

The computer system 10 is operational with numerous other general purpose or special purpose computing system environments or configurations. Examples of well-known computing systems, environments, and/or configurations that may be suitable for use with the computer system 10 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system 10 may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 1, the computer system 10 is shown in the form of a general-purpose computing device. The components of the computer system 10 may include, but are not limited to, one or more processors (or processing units) 12 and a memory 16 coupled to the processors 12 by a bus including a memory bus or memory controller, and a processor or local bus using any of a variety of bus architectures.

The one or more processors may include, but are not limited to, Blue Gene®/Q, zEnterprise® EC13, Intel® Haswell and/or POWER 8® that have multiple physical cores 14 with hardware transactional memory support and support SMT functionality where multiple hardware threads can run on each physical core 14 concurrently.

The computer system 10 may include a variety of computer system readable media. Such media may be any available media that is accessible by the computer system 10, and it includes both volatile and non-volatile media, removable and non-removable media.

The memory 16 can include computer system readable media in the form of volatile memory, such as random access memory (RAM). The computer system 10 may further include other removable/non-removable, volatile/non-volatile computer system storage media. By way of example only, the storage system 18 can be provided for reading from and writing to a non-removable, non-volatile magnetic media. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus by one or more data media interfaces. As will be further depicted and described below, the storage system 18 may include at least one program product having a set (e.g., at least one) of program modules that are configured to carry out the functions of embodiments of the invention.

Program/utility, having a set (at least one) of program modules, may be stored in the storage system 18 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the invention as described herein.

The computer system 10 may also communicate with one or more peripherals 24 such as a keyboard, a pointing device, etc.; a display 26; one or more devices that enable a user to interact with the computer system 10; and/or any devices (e.g., network card, modem, etc.) that enable the computer system 10 to communicate with one or more other computing devices. Such communication can occur via Input/Output (I/O) interfaces 22. Still yet, the computer system 10 can communicate with one or more networks such as a local area network (LAN), a general wide area network (WAN), and/or a public network (e.g., the Internet) via the network adapter 20. As depicted, the network adapter 20 communicates with the other components of the computer system 10 via bus. It should be understood that although not shown, other hardware and/or software components could be used in conjunction with the computer system 10. Examples, include, but are not limited to: microcode, device drivers, redundant processing units, external disk drive arrays, RAID systems, tape drives, and data archival storage systems, etc.

Figure 2A:
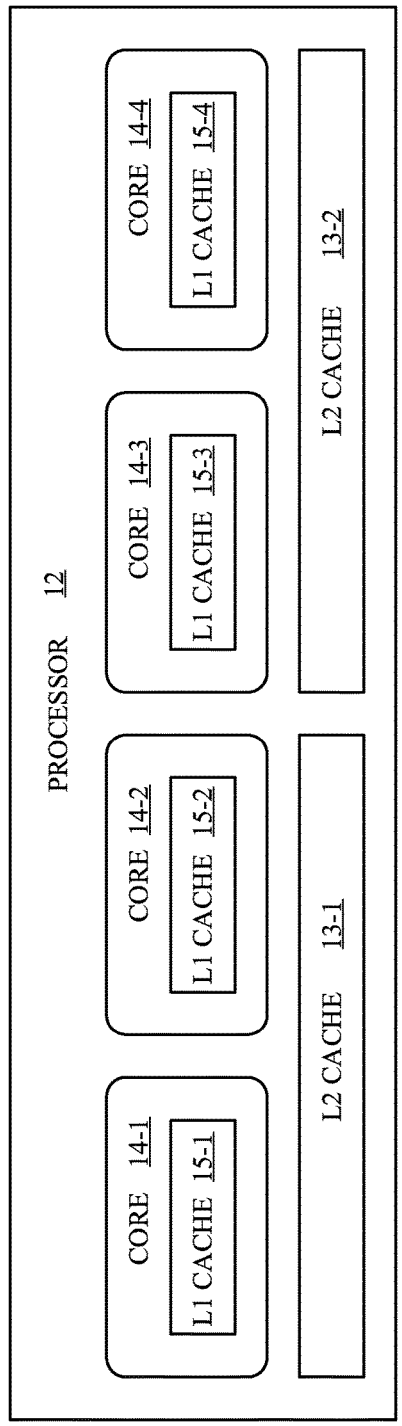
FIG. 2A shows an example of shared resources in a computer system according to an exemplary embodiment of the present invention.
Figure 2B:
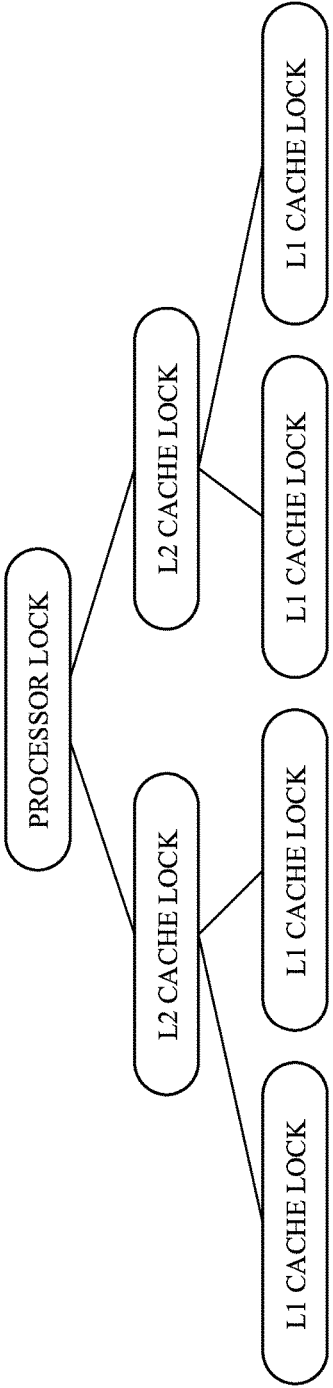
FIG. 2B shows hierarchical locks corresponding to the shared resources shown in FIG. 2A.

Referring now to FIGS. 2A and 2B, an example of shared resources and associated hierarchical locks is shown. The shared resources and the hierarchical locks shown in FIGS. 2A and 2B are only examples for an illustrative computer system and are not intended to suggest any limitation.

As shown in FIG. 2A, a processor 12 has four physical cores 14-1~14-4. Caches are organized as a hierarchy of multiple cache levels in the processor 12. The processor 12 shown in FIG. 2A has two level caches that includes an L1-cache 15 for each physical core 14 and an L2-cache 13 for each pair of cores 14. Of course this is an example of many designs that can be used in one or more embodiments, the processor 12 may have more or less physical cores and other form of hierarchical caches. Also the computer system 10 may have plurality of processors 12 to organize a multiprocessor system.

As shown in FIG. 2B, three level hierarchical locks are shown for the processor shown in FIG. 2A. Each lock in the hierarchical locks may be associated with a shared resource such as a L1-cache, a L2-cache, a processor, etc. The hierarchical locks shown in FIG. 2B includes one top level processor lock, two intermediate level L2-cache locks, and four bottom level L1-cache locks.

Of course this is an example of many designs that may be applicable for the computer system. The organization of the hierarchical locks may be dependent on a specific architecture of the computer system 10. In general, the processors implement the HTM facilities on cache mechanisms. The processors keep track of memory loads and stores during transactions in the caches. For example, in Blue Gene®/Q, a dedicated L1-cache is provided to each core, and all cores share L2-cache for conflict detections and for store buffering. Intel® Core uses the L1-cache for conflict detection and store buffering. POWER 8® uses content addressable memory linked with the L2-cache for conflict detection and uses the L2-cache for transactional store buffering.

Hereinafter, referring first to the series of FIGS. 3-5, a computer system and method for will be described executing a program region according to first embodiment of the present invention, in which two level hierarchical locks are employed with hardware transactional memory support. Then, referring to FIG. 6, a computer executable program will be described for executing a program region with transactional memory support according to second embodiment of the present invention. Then, referring to the series of FIGS. 7 and 8, a computer system and method will be described for executing a program region with transactional memory support according to third embodiment of the present invention, that is an alternative embodiment of the present invention where not less than three levels of the hierarchical locks are employed. Finally, referring to FIGS. 9A and 9B, a non-limiting feature of a transaction retry and lock mechanism will be described according to one or more embodiments of the present invention.

First Embodiment

Figure 3:
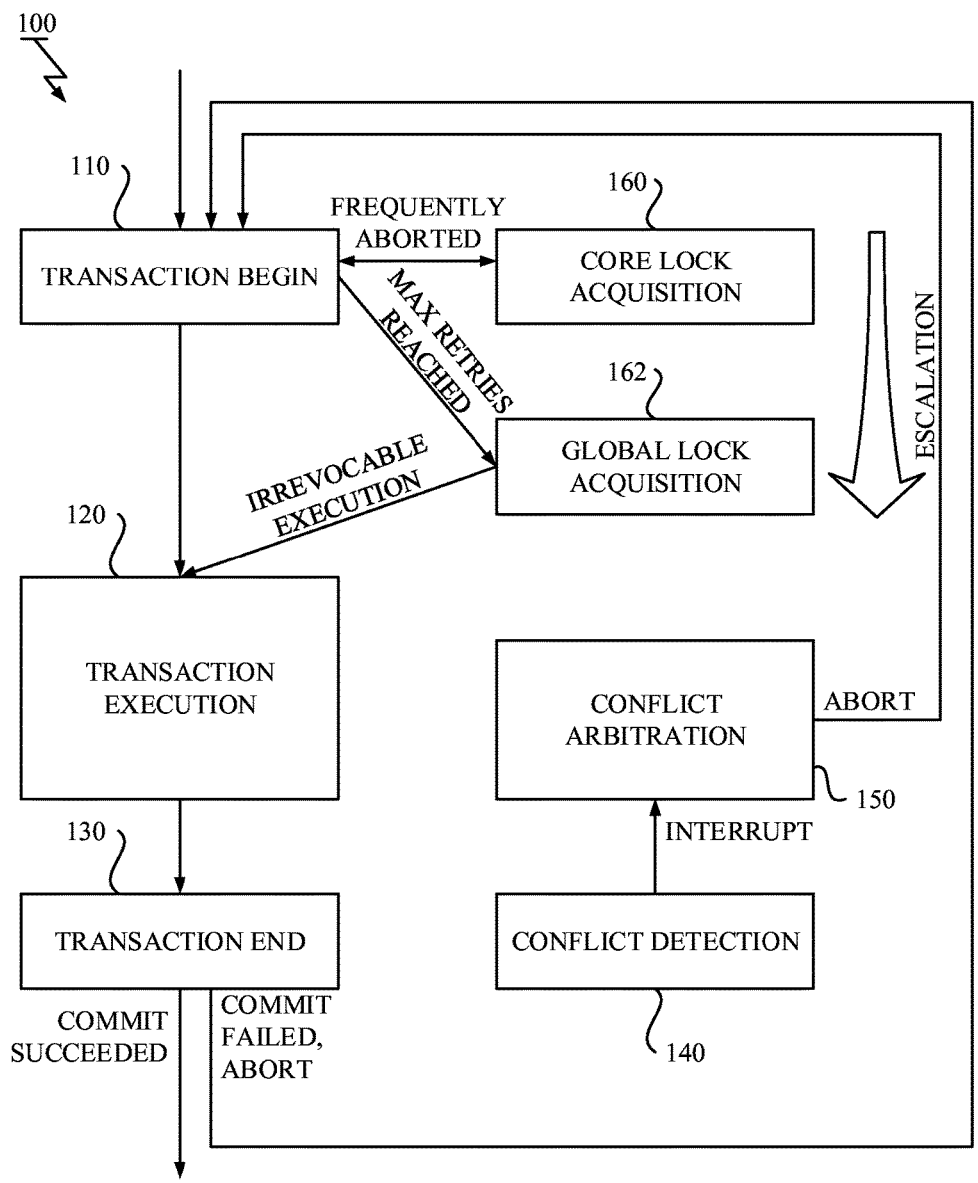
FIG. 3 illustrates a block diagram of a computer system and overview of a transactional memory execution in a computer system according to first embodiment of the present invention.

Referring now to FIG. 3, a block diagram of a computer system and overview of a transactional memory execution are illustrated. As shown in FIG. 3, the computer system 100 may include a transaction begin module 110, a transaction execution module 120, a transaction end module 130, a conflict detection module 140, a conflict arbitration module 150, a core lock acquisition module 160 and a global lock acquisition module 162.

The transaction begin module 110 is configured to begin a transaction for a program region by using a transaction begin machine instruction, TBEGIN or XBEGIN (hereinafter only TBEGIN is mentioned). The transaction end module 130 is configured to end the transaction for the program region by using a transaction end machine instruction, TEND or XEND (hereinafter only TEND is mentioned). Each transaction begins with the TBEGIN instruction by the transaction begin module 110 and is ended by the TEND instruction by the transaction end module 130.

The transaction execution module 120 is configured to execute the program region in the transaction. Operations inside the transaction are executed as an atomic operation regarding operations in other concurrent transactions. In the environment, programmers can specify the program region that may access shared variables as the transaction by using functions corresponding to the transaction begin module 110 and the transaction end module 130.

When the transaction begins, hardware or software saves contents of registers of the processor. When the execution reaches the end of the transaction, the processor attempts to commit the transaction. If the commit fails, the transaction may be aborted, rolled back by the transactional memory support and retried at a later time. Upon aborting, all of the transactional store data is discarded and the saved register contents are restored.

The conflict detection module 140 is configured to detect write-read, read-write and write-write conflicts among concurrent transactions during the transactional execution. When a conflict is detected, the conflict detection module 140 aborts at least one of the transactions that cause the data conflict. When a capacity overflow occurs, the transaction may be immediately aborted.

In the present embodiment, the transaction begin module 110 is further configured to incorporate an algorithm to begin and retry transactions with the hierarchical locks. Also the transaction end module 130 is further configured to incorporate an algorithm to end appropriately the transaction that is started by the transaction begin module 110.

For this purpose, in the present embodiment, two level hierarchical locks that have a top level lock and one or more bottom level locks are utilized. The top level lock is a global lock associated with the whole system. Each bottom lock is associated with a physical core of the processor as a shared resource of the computer system 100. The core lock acquisition module 160 is configured to acquire or release the corresponding core lock for a thread. The global lock acquisition module 162 is configured to acquire or release the global lock for a thread.

In the first embodiment, the transaction begin module 110 determines whether a predetermined condition related to transaction aborts (e.g. threshold for transaction abort ratio) is satisfied in beginning the transaction for the program region. When the predetermined condition is satisfied (e.g., the if transaction abort ratio exceeds the threshold), the transaction begin module 110 acquires the corresponding core lock for the thread by using the core lock acquisition module 160, so as to restrict activity of another thread on the same core with the thread. The transactions of threads running on the same core corresponding to the core lock acquired by the thread are serialized. Then, the transaction begin module 110 begins execution of a transaction for the program region by using the TBEGIN instruction.

When the transaction aborts, the transaction begin module 110 further determines whether another predetermined condition related to the transaction (e.g., threshold for retry count) is satisfied. When this predetermined condition is not satisfied (e.g., retry count does not reach to maximum), the transaction begin module 110 retries the transaction for the program region by using the TBEGIN instruction. During when the transaction is retried, the core lock continues to be acquired. When another predetermined condition is satisfied (e.g. the transaction reaches max retries), the transaction begin module 110 releases the core lock and then acquires the global lock by using the global lock acquisition module 162 so as to serialize all threads for the program region. In this case, the transaction is conducted in irrevocable mode, meaning that the program region is executed outside the transaction.

The transaction end module 130 is configured to change the control flow depending on the states of the core lock and global lock. When the global lock is not acquired, the transaction end module 130 ends the transaction by using the TEND instruction, and releases the corresponding core lock if the corresponding core lock is acquired by the thread. On the other hand, when the global lock is acquired, the transaction end module 130 merely releases the global lock upon ending the execution of the program region. The TEND instructions are not executed since the execution is no longer transactional.

In such manner, the current lock level acquired by the thread may be escalated until reaching the top level where the global lock is acquired if the transaction aborts still occur. Therefore, the extent of serialization can extend gradually in accordance with situation about the transaction aborts.

As shown in FIG. 3, the computer system 100 includes one or more modules to provide various features and functions. These modules may be implemented in hardware, software or firmware executable on hardware, or a combination thereof. However, in a preferable embodiment, the transaction begin module 110 and the transaction end module 130 can be implemented by hardware logics that responds to a transaction begin and end instructions, respectively. Such hardware implementation can simplify software modifications and reduce the overhead to handle core locks.

Also, these modules are presented only by way of example and are not intended to suggest any limitation. Alternative embodiments may include additional or fewer modules than those illustrated in FIG. 3, or the modules may be organized differently. Furthermore, it should be recognized that, in some embodiments, the functionality of some modules may be broken into multiple modules or, conversely, the functionality of several modules may be combined into a single or fewer modules.

Figure 4:
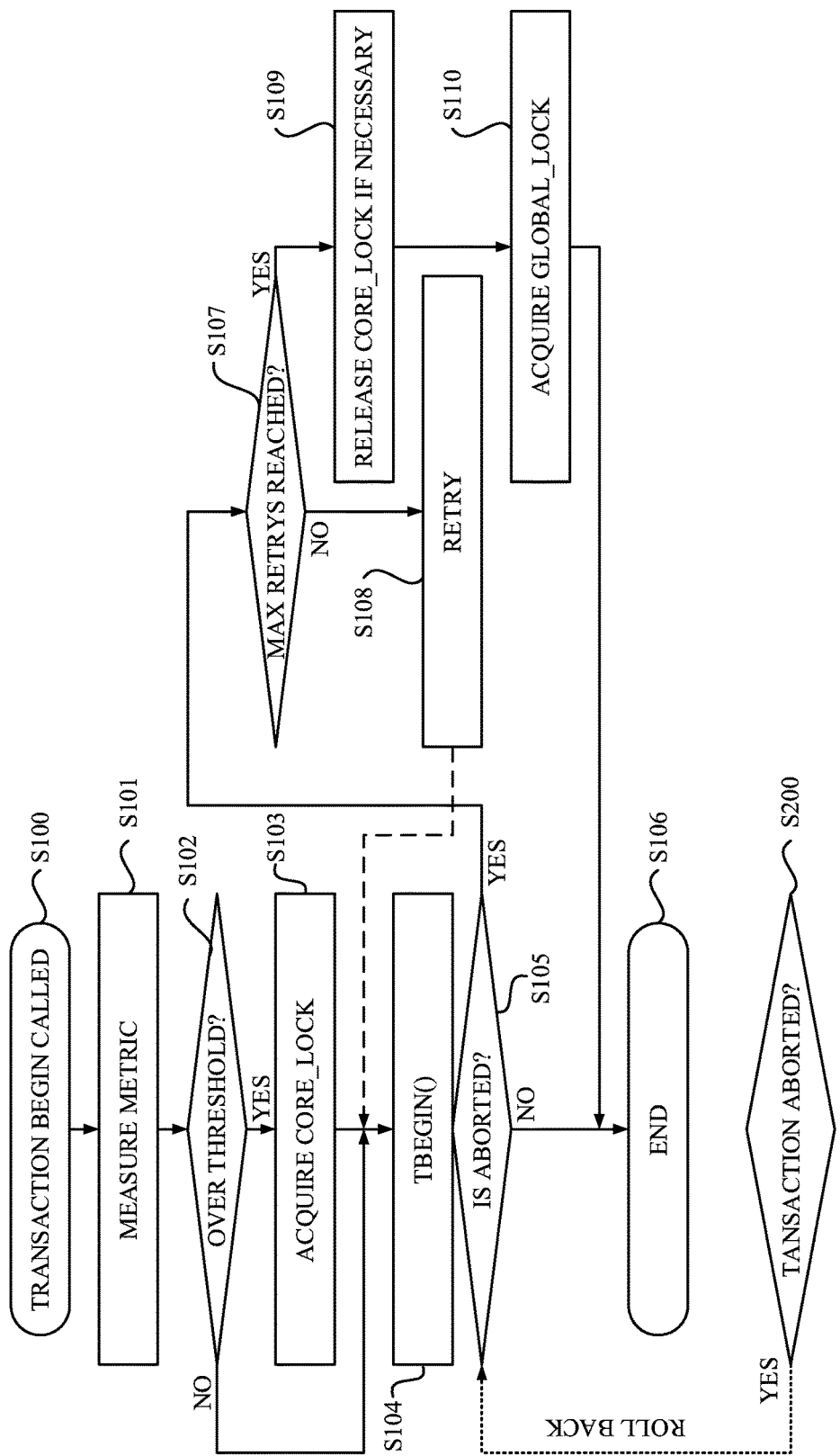
FIG. 4 is a flowchart depicting a process for beginning a transaction according to the first embodiment of the present invention.

Referring to FIG. 4, a flowchart depicting a process for beginning a transaction is shown. As shown in FIG. 4, the process begins at step S100. Note that the process shown in FIG. 4 is performed by a thread that executes the program region after calling the transaction begin function corresponding to the transaction begin module 110 depicted in FIG. 3. In a particular embodiment, the thread waits for the global lock or the corresponding core lock to be released before beginning the transaction if the global lock or the corresponding core lock is acquired.

At step S101, the thread measures a performance metric for the predetermined condition. The performance metric used in the particular embodiment is a transaction-abort ratio. The transaction-abort ratio is a percentage of the aborted transactions to all of the transactions attempted. In particular embodiment, the transaction abort ratio is measured for the all program regions in the target program. However, in other embodiment, the transaction abort ratio can be measured for each program region in the target program. In another embodiment, the transaction abort ratio can be measured by a particular reason. For example, the transaction abort ratio due to the capacity overflow may be used for the predetermined condition.

At step S102, the thread determines whether the predetermined condition related to transaction aborts is satisfied. In the describing embodiment, the thread determines whether the measured performance metric exceeds the predetermined threshold. If the thread determines that the measured metric exceeds the predetermined threshold (S102: YES), then process proceeds to step S103. In the particular embodiment the threshold may be a fixed value, however, in other embodiment, the predetermined threshold can be varied over program regions in the target program. In another embodiment, the predetermined threshold can be dynamically optimized by an online machine learning algorithm.

In the step S103, the thread acquires the core lock corresponding to the core by calling a function of the core lock acquisition module 160, so as to serialize the threads that run in the core. The acquired lock may be stored in the thread local storage so that the acquired lock is ensured to be released even if the thread is migrated to other physical core by a task scheduler of the operating system. To avoid running a thread in a core with acquiring a core lock corresponding to another core after thread migration, the core lock acquisition module 160 may check whether each thread acquires the core lock corresponding to the core where the thread runs whenever it retries the transaction. If a thread acquires a core lock corresponding, to a different core, it may release the wrong core lock, and then acquire the right core lock. Alternatively, upon beginning the transaction, the threads may be bound to a specific physical core (i.e., by setting affinity) so that the acquired lock is not needed to be stored in the thread local storage.

If the thread determines that the measured performance metric does not exceed the predetermined threshold (S102: NO), the process proceeds directly to step S104. In step S104, the thread executes the TBEGIN instruction to enter a transaction. In step S105, the thread checks a condition code and determines whether the current transaction is aborted. Initially, the TBEGIN instruction returns a specific condition code that indicates no presence of transaction abort, hence the thread determines that the transaction is not aborted. If the transaction is not aborted, then the process ends at S106, followed by a transactional execution of the program region.

During the transactional execution, the thread executes operations of the program region in the transaction. However, during the execution of the transaction or at the end of transaction, the transaction may abort due to data conflicts, resource conflicts or violations. In the present embodiment, the transaction may abort due to data conflicts on the global lock or the corresponding core lock. If the transaction is aborted at step S200, then the transaction is rolled back and the program execution returns to immediately after the instruction that has begun the transaction in the particular embodiment. In this case, the TBEGIN instruction sets a specific condition code that indicates reason of abortion, hence the thread determines that the transaction is aborted at step S105 and then the process branched to step S107.

At step S107, the thread further determines whether another predetermined condition related to the transaction is satisfied. In the describing embodiment, the thread determines whether the retry count reaches a maximum count or not. If the thread determines that the retry count does not reach the maximum (S107: NO), the process branches to step S108. At step S108, the thread jumps to the step S104 to retry the transaction. The thread may wait for the global lock or the corresponding core lock to be released if necessary and the thread executes the TBEGIN instruction to attempt to enter the transaction again at step S104.

By repeated transaction aborts, if the thread determines the retry count reaches the maximum (Step 107: YES), then the process branches to step S109. At step S109, the thread releases the core lock by using the core lock acquisition module 160 if the thread acquired the core lock at step S103. At step S110, the thread acquires the global lock by using the global lock acquisition module 162 so as to serialize all threads, and process proceeds to step S106 and ends at S106, followed by an irrevocable execution of the program region. Therefore, transaction aborts may not further occur and the program region can be executed outside the transaction. In the described embodiment, since the corresponding core lock may be released prior to the acquiring of the global lock, deadlocks are prevented.

Figure 5:
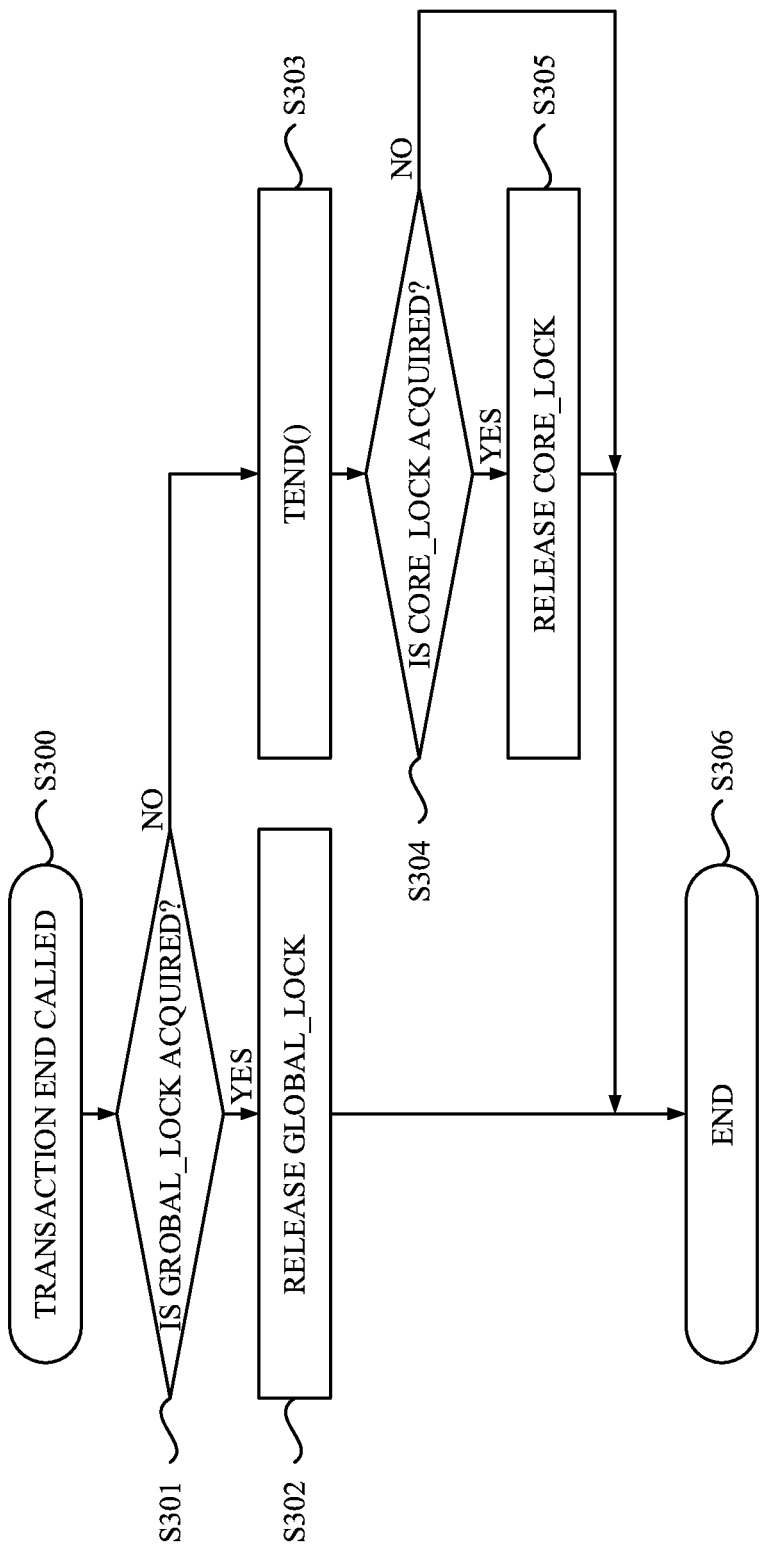
FIG. 5 is a flowchart depicting a process for ending a transaction according to the first embodiment of the present invention.

Referring to FIG. 5, a flowchart depicting a process for ending a transaction is shown. As shown in FIG. 5, the process begins at step S300. Note that the process shown in FIG. 5 may be performed by the thread in response to calling of the transaction end function corresponding to the transaction end module 130 depicted in FIG. 3 after the transaction begin function and transaction execution body code.

At step S301, the thread determines whether the global lock is acquired. If the global lock is acquired (S301: YES), then process proceeds to step S302. At step S302, the thread releases the global lock so as to allow all threads to execute transactions, and then the process ends at S306.

If the global lock is not acquired (S301: NO), then the process branches to step S303. At step S303, the thread executes the TEND function to end the transaction. At step S304, the thread determines whether the corresponding core lock is acquired. If the core lock is acquired (S303: YES), then process proceeds to step S305. At step S305, the thread releases the core lock so as to allow other threads sharing resource with the thread to execute transactions and then the process ends at S306. The acquired core lock may be retrieved from the thread local storage. If the core lock is not acquired (S303: NO), then process proceeds directly to step S306 and then the process ends at S306.

Second Embodiment

Now referring to FIG. 6, it will be described a computer executable program for executing a program region with transactional memory support according to second embodiment of the present invention.

As shown in FIG. 6, a pseudo-code of a computer program implementing a transaction retry and hierarchical lock mechanism is shown.

The pseudo-code of the computer program includes computer-executable program code to determine whether a predetermined condition is satisfied (e.g., abort_ratio>$T_{core\_lock}$; the "abort_ratio" is a transaction abort ratio metric, and the "$T_{core\_lock}$" is a threshold for the transaction abort ratio metric) at Line 1 in beginning a transaction. The pseudo-code includes program code to acquire a corresponding core lock by a thread that executes the program region (corresponding to a transaction body omitted by the comment at Line 21) at Line 4 if the predetermined condition is satisfied. The corresponding core lock is identified at Lines 2-3 and the acquired core lock is stored in a thread local storage at Line 5.

The pseudo-code includes further program code to begin a transaction for the program region with transactional memory support at Line 8. The pseudo-code includes program code to release the corresponding core lock by the thread at Line 27, upon ending the transaction, if the thread determines that the corresponding lock is acquired by the thread at Line 26.

As shown in FIG. 6, the pseudo-code includes further program code to execute the program region by the thread in the transaction at Line 21 and to end the transaction at Line 25 if the thread determines that the global lock is released at Line 22.

The pseudo-code includes further program code to determine whether a global lock condition is satisfied at Line 10 in response to aborting of the transaction and to retry the transaction by jumping at line 18 to a label for retrying transaction at Line 7 if the thread determines the global lock condition is not satisfied at Line 10. The pseudo-code includes program code to acquire the global lock by the thread at Line 15 if the thread determines that the global lock condition is satisfied at Line 10.

If the global lock is acquired, program code for executing the program region at Line 21 becomes to normal program code outside the transaction. The pseudo-code includes further program code to release the global lock at Line 23 if the global lock is acquired at Line 22.

The pseudo-code may include further program code to define the global lock and one or more core locks, each of which is associated with a physical core of the processor of the computer system.

The program code from Line 1 to Line 20 prior to the transaction body can be provided as a software library that executes the algorithm shown in Lines 1-20 in response to a transaction begin function defined in a user program. Also the program code from Line 22 to Line 30 posterior to the transaction body can be provided as software library that executes the algorithm shown in Lines 22-30 in response to a transaction end function defined in a user program. Such software library implementations can simplify programming of the programmer. Programmers can simply define a program region as a transaction by using the software libraries.

However, in a preferable embodiment, the algorithm corresponding to the program code from Lines 1 to 20 can be implemented by hardware logic that responds to the transaction begin function defined in the user program. And the algorithm corresponding to the program code from Lines 22 to 30 can be implemented by hardware logic that responds to the transaction end function defined in the user program. Such hardware implementations can simplify software modifications.

Third Embodiment

Now referring to the series of FIGS. 7-8, it will be described a computer system and method for executing a program region according to third embodiment of the present invention. As described above, the first and second embodiment utilizes the two level hierarchical locks mechanism including the global lock and the one or more core locks. In contrast to the first and second embodiments, the third embodiment is an alternative embodiment of the present invention where not less than three levels of the hierarchical locks are utilized.

Figure 7:
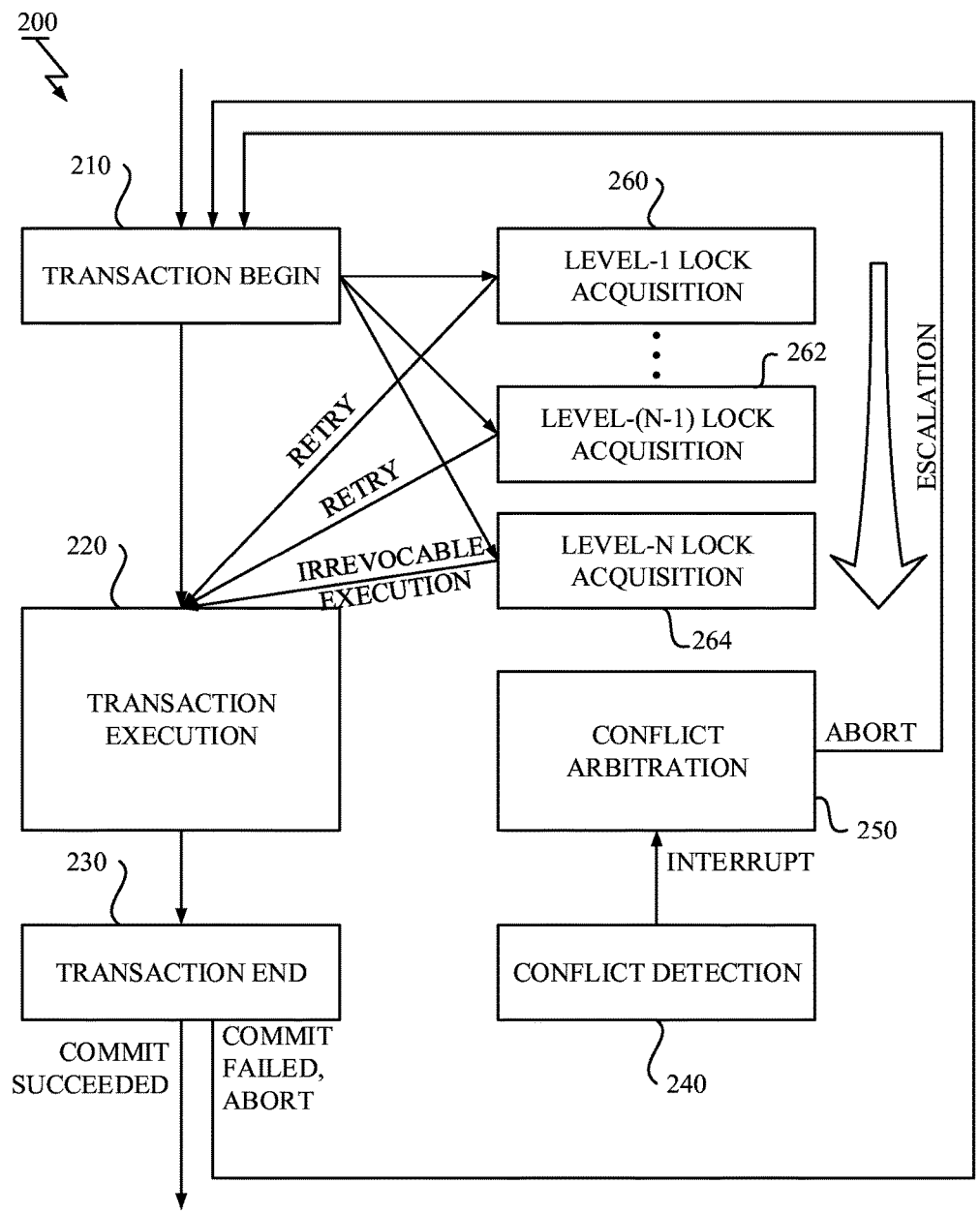
FIG. 7 illustrates a block diagram of a computer system and overview of a transactional memory execution in a computer system according to third embodiment of the present invention.

FIG. 7 illustrates a block diagram of a computer system 200 according to the third embodiment of the present invention. As shown in FIG. 7, as similar to the first embodiment, the computer system 200 includes a transaction begin module 210 that begins execution of a transaction for a program region in a target program, a transaction execution module 220 that executes the program region in the transaction, a transaction end module 230 that ends the execution of the transaction, a conflict detection module 240 that detects data conflict, resource conflicts or violations and a conflict arbitration module 250 that performs conflict arbitration.

The computer system 200 according to the third embodiment of the present invention includes a level-1 lock acquisition module 260, . . . , a level-(N-1) lock acquisition module 262 and a level-N lock acquisition module 264. N is the number of hierarchy of the locks. The level-1 lock acquisition module 260 and the level-N lock acquisition module 264 may correspond to the core lock acquisition module 160 and the global lock acquisition module 162 in the first embodiment, respectively. For more than three hierarchies, the computer system 200 includes the hierarchical locks having the bottom level, the top level and one or more intermediate levels between the bottom and top levels.

The top level lock may be a global lock associated with the whole system. Each bottom lock may be associated with a physical core of the processor. Each intermediate lock may be associated with other shared resources such as a pair of cores, a group of pairs, L2-cache, etc. The level-n lock acquisition module is configured to acquire the lock of corresponding level for the thread.

In the third embodiment, the transaction begin module 210 is further configured to incorporate an algorithm to begin and retry transactions with the multi-level hierarchical locks, and the transaction end module 230 is further configured to incorporate an algorithm to end the transaction appropriately that is started by the transaction begin module 210.

The transaction begin module 210 determines whether a predetermined condition for next level is satisfied in the beginning of the transaction for the program region. When the predetermined condition for a next level is determined to be satisfied, the transaction begin module 210 acquires a corresponding lock of next level for the thread by using the corresponding acquisition module so as to escalate a current lock level acquired by the thread until reaching the top level where the level N lock is acquired.

The program regions may be executed in the transaction by retrying the transaction until reaching the top level where the transaction shifts to irrevocable mode. The extent of serialization may be gradually extended in a step by step manner up to the level N lock being acquired.

Figure 8:
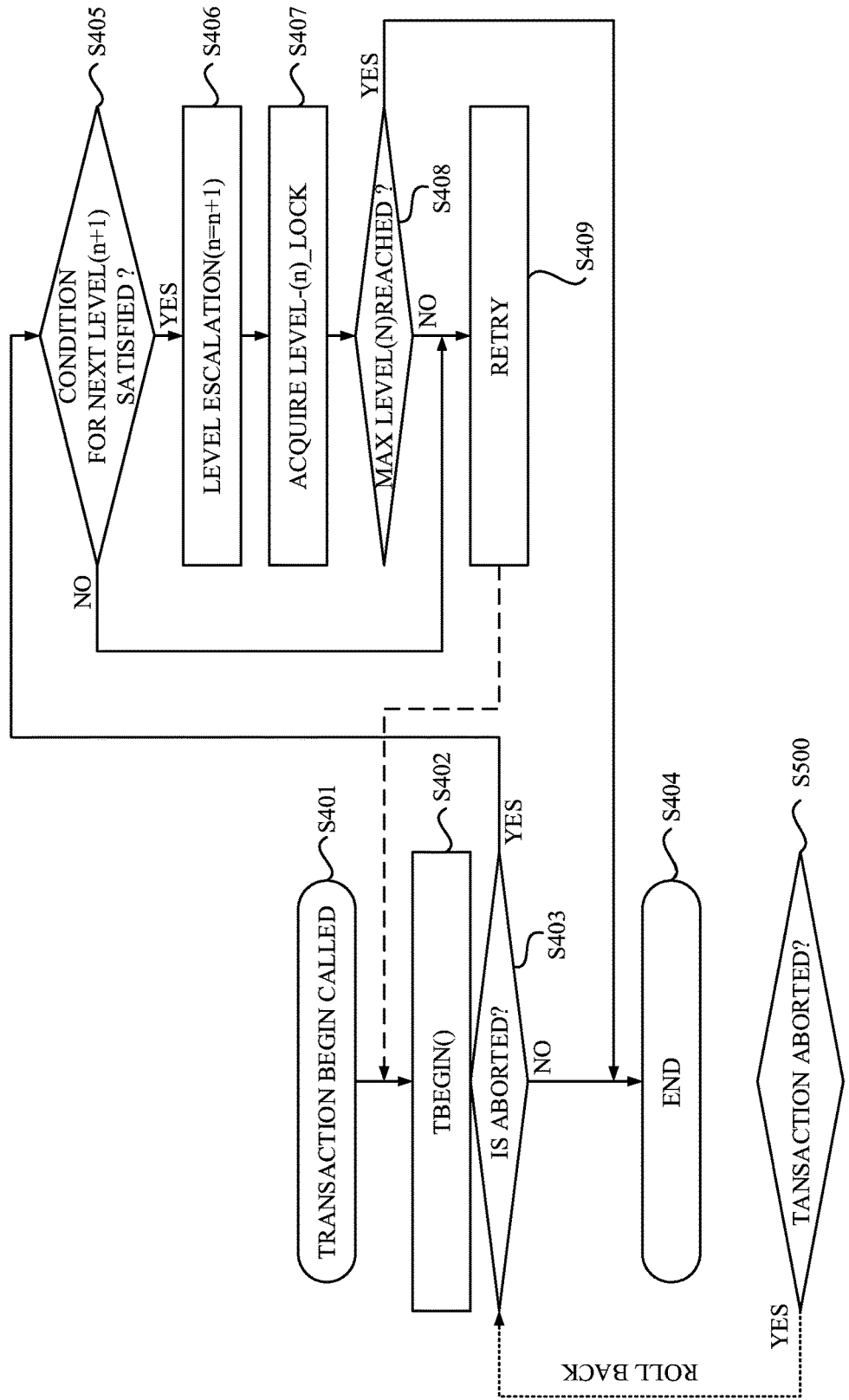
FIG. 8 is a flowchart depicting a process for beginning a transaction according to the third embodiment of the present invention.

Referring to FIG. 8, a flowchart depicting a process for beginning a transaction is shown. As shown in FIG. 8, the process begins at step S401. Note that the process shown in FIG. 8 may be performed by a thread that executes the program region after calling the transaction begin function corresponding to the transaction begin module 210 depicted in FIG. 7.

At step S402, the thread executes the TBEGIN instruction to enter a transaction. At Step S403, the thread checks a condition code and determines whether the current transaction is aborted. If the thread determines that the transaction is not aborted, then the process ends at S404, followed by a transactional execution of the program region.

During the execution of the transaction or at the end of transaction, the transaction may abort due to data conflicts, resource conflicts, lock conflicts and violations. If the transaction is aborted at step S500, the program execution returns to immediately after the instruction that has begun the transaction in the particular embodiment. In this case, the TBEGIN instruction returns a specific condition code that indicates a reason of abortion, hence the thread determines that the transaction is aborted at step S403 and then the process branched to step S405.

At step S405 the thread determines whether the predetermined condition for next level (n+1) is satisfied. The predetermined condition for each level from 1 to N−1 may be a threshold for performance metrics such as transaction abort ratio or retry counts. The predetermined condition for level N may be a threshold for the retry counts. If the thread determines that the predetermined condition for next level (n+1) is satisfied (S405: YES), then the process proceeds to step S406. At step S406, the thread escalates the current level (n++). At step S407, the thread acquires the level-n lock corresponding to the thread by using a function of the appropriate acquisition module. Before acquiring the level-n lock, the thread may release previously acquired level n−1 lock if necessary.

At step S408, the thread determines whether the current level reaches max level (n=N). If the thread determines that the current level does not reach max level yet, the process branches to step S409. Also if the thread determines that the predetermined condition for the next level (n+1) is not satisfied (S405: NO), then process proceeds directly to step S409. At step S409, the thread jumps to the step S402 to retry the transaction. The thread may wait for the any level lock to be released if necessary and the thread executes the TBEGIN instruction to attempt to enter the transaction again at step S402.

By repeated transaction aborts, if the current level reaches the max level (Step 408: YES), then the process branches to step S404 and then the process ends at S404, followed by an irrevocable execution of the program region.

A process for ending a transaction according to the third embodiment may be similar to the flowchart depicted in FIG. 5. At steps S304 and S305 in FIG. 5, the thread releases a lock corresponding to the current level.

In such manner, the current lock level acquired by the thread can be escalated until reaching the top level where the global lock is acquired if the transaction aborts still occur. Therefore, extent of serialization can extend gradually in accordance with the situation about the transaction aborts.

Behavior of Threads

Figures 9A, 9B:
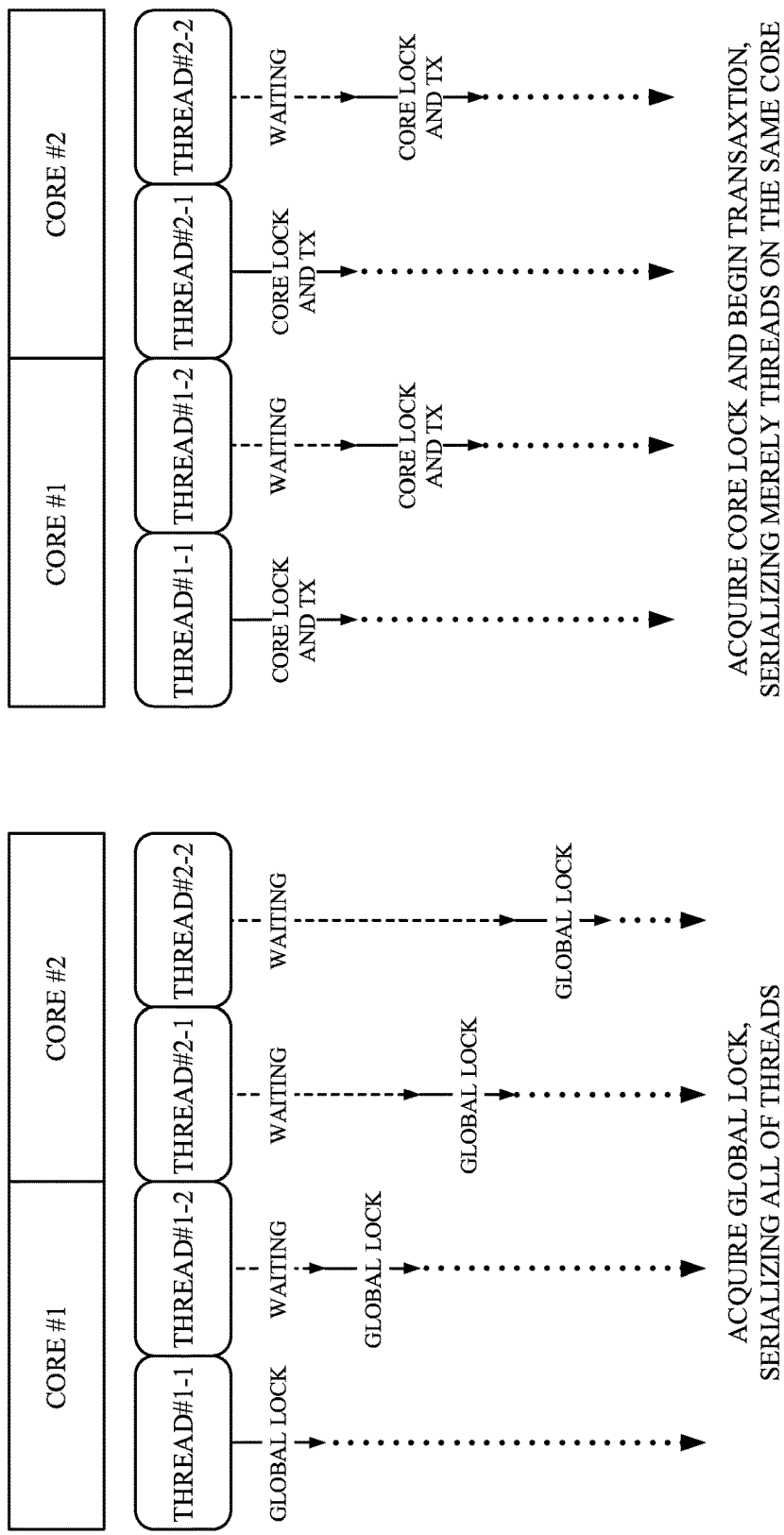
FIG. 9A depicts behaviors of threads running on a processor by adapting a transaction retry mechanism with merely global lock.
FIG. 9B depicts behaviors of threads running on a processor of a computer system implementing a transaction retry and hierarchical lock mechanism according to one or more embodiments of the present invention.

Referring to FIGS. 9A and 9B, a non-limiting feature of a transaction retry and lock mechanism will be described according to one or more embodiments of the present invention.

FIG. 9A depicts behaviors of threads running on a processor by adapting a transaction retry mechanism with merely global lock. And FIG. 9B depicts behaviors of threads running on a processor of a computer system that implements a transaction retry and hierarchical lock mechanism according to one or more embodiments of the present invention, in which one global lock and one or more core locks are employed.

Note that each solid arrow represents execution of the program region. Each dot arrow represents execution of codes outside the program region. And each dash arrow represents a wait for a core lock to be released.

As shown FIG. 9A, by the transaction retry mechanism with merely global lock, the thread acquires the global lock when the transaction retry reaches maximum, resulting in serializations of all of the threads beyond the physical cores.

In comparison with the retry mechanism shown in FIG. 9A, by virtue of the novel transaction retry and lock mechanism with hierarchical locks, the thread acquires, at first, the bottom level lock that corresponds to each core and begins the transaction. Serialization may occur between the threads running on the same physical core, thereby maintaining degree of concurrency in the transactional memory executions.

The program region can be executed in the transaction by the thread with acquiring the lock corresponding to the shared resource, thereby preventing occurrence of transaction aborts caused by resource conflicts between the threads that share the same specific resource and avoiding serializations of transactions beyond the shared resource. The other abort conditions such as data conflicts among the threads running on the different physical core may be detected by using transactional memory support.

Computer Program Implementation

The present invention may be a computer system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more aspects of the present invention has been presented for purposes of illustration and description, but is not intended to be exhaustive or limited to the invention in the form disclosed.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for executing a program region by a computer system using hierarchical locks with transactional memory support, each lock being associated with a shared resource among available resources, the method comprising:
    detecting data conflicts among concurrent transactions via a conflict detection module to abort a transaction that caused at least one of the data conflicts;
    arbitrating the remaining data conflicts via a conflict arbitration module;
    retrying the aborted transaction for the program region by determining whether a first condition related to a transaction abort is satisfied;
    acquiring a bottom level lock corresponding to a bottom level resource among the available resources to execute the program region in the transaction if the first condition is satisfied;
    acquiring a next level lock corresponding to a next level resource, after releasing the bottom level lock, if a second condition related to a threshold for transaction retries is determined to be satisfied; and executing the program region without using the transaction if the acquired next level lock is a top level lock corresponding to a top level resource.

2. The method of claim 1, wherein the method further comprises:

ending the transaction and releasing the acquired lock if the top level lock is released; and releasing the top level lock upon ending the executing of the program region if the top level lock is acquired.

3. The method of claim 2, wherein the determining of the first condition and the beginning of the transaction are performed by a hardware logic in response to a transaction begin instruction and the ending of the transaction and the releasing of the acquired lock, or the releasing of the top level lock are performed by a hardware logic in response to a transaction end instruction.

4. The method of claim 1, wherein the hierarchical locks have one or more intermediate level locks between the top level lock and the bottom level lock, the method further comprising:

escalating a current level until reaching the top level where the top level lock is acquired.

5. The method of claim 1, wherein the transaction is rolled back in response to aborting the transaction by the transactional memory support.

6. The method of claim 1, wherein the method further comprises:

in response to determining that the second condition is not satisfied, retrying the transaction.

7. The method of claim 1, further comprising serializing all threads of the program region after releasing the bottom level lock.

8. The method of claim 1, wherein the method further comprises:

measuring a transaction abort ratio, wherein the first condition is determined to be satisfied if the transaction abort ratio exceeds a predetermined threshold.

9. The method of claim 8, wherein the transaction abort ratio is measured for each program region.

10. The method of claim 8, wherein the predetermined threshold is varied over program regions.

11. The method of claim 8, the transaction abort ratio is measured by a reason for termination.

12. The method of claim 8, wherein the predetermined threshold is optimized by an online machine learning algorithm.

13. The method of claim 1, wherein the acquired lock is stored in a thread local storage or each thread is bound to a specific physical core in the beginning of the transaction.

14. The method of claim 1, wherein the computer system has one or more processors with simultaneous multi-threading support, each processor including one or more physical cores where one or more threads run concurrently.

15. A computer system for executing a program region by executing program instructions, the computer system comprising:

a memory tangibly storing the program instructions; and at least a processor in communications with the memory, wherein the computer system has transactional memory support and uses hierarchical locks, each lock being associated with a shared resource among available resources, the computer system being configured to:

detect data conflicts among concurrent transactions via a conflict detection module to abort a transaction that caused at least one of the data conflicts;

arbitrate the remaining data conflicts via a conflict arbitration module;

determine whether a first condition related to a transaction abort is satisfied when retrying the aborted transaction for the program region;

acquire a bottom level lock corresponding to a bottom level resource among the available resources to execute the program region in the transaction if the first condition is satisfied;

acquire a next level lock corresponding to a next level resource, after releasing the bottom level lock, if a second condition related to a threshold for transaction retries is determined to be satisfied; and execute the program region without using the transaction if the acquired next level lock is a top level lock corresponding to a top level resource.

16. The computer system of claim 15, wherein the computer system is further configured to:

end the transaction and release the acquired lock if the top level lock is released; and release the top level lock upon ending the executing of the program region if the top level lock is acquired.

17. The computer system of claim 16, wherein the hierarchical locks have one or more intermediate level locks between the top level lock and the bottom level lock, the computer system being further configured to:

escalating a current level until reaching the top level where the top level lock is acquired.

18. A computer system for executing a program region with transactional memory support, the computer system comprising:

a conflict detection module to detect data conflicts among concurrent transactions to abort a transaction that caused at least one of the data conflicts;

a conflict arbitration module to arbitrate the remaining data conflicts;

hierarchical locks, each lock being associated with a shared resource among available resources; and a transaction begin module configured to:

determine whether a first condition related to a transaction abort is satisfied when retrying the aborted transaction for the program region;

acquire a bottom level lock corresponding to a bottom level resource to execute the program region in the transaction if the first condition is satisfied; and acquire a next level lock corresponding to a next level resource, after releasing the bottom level lock, if a second condition related to a threshold for transaction retries is determined to be satisfied;

wherein the program region is executed without using the transaction if the acquired next level lock is a top level lock corresponding to a top level resource.

19. The computer system of claim 18, wherein the computer system further comprises:

a transaction end module configured to end the transaction and release the acquired lock if the top level lock is released; and release the top level lock upon ending the executing of the program region if the top level lock is acquired.

20. The computer system of claim 19, wherein the hierarchical locks have one or more intermediate level locks between the top level lock and the bottom level lock, the transaction begin module being configured to escalate a current level until reaching the top level where the top level lock is acquired.

21. The computer system of claim 19, wherein the transaction begin module is implemented by a hardware logic for responding to a transaction begin instruction and the transaction end module is implemented by a hardware logic for responding to a transaction end instruction.

22. A computer program product for executing a program region, the computer program product comprising a computer readable storage medium having program instructions embodied therewith, wherein the computer readable storage medium is not a transitory signal per se, the program instructions comprising:
- computer-executable program code to detect data conflicts among concurrent transactions via a conflict detection module to abort a transaction that caused at least one of the data conflicts;
- computer-executable program code to arbitrate the remaining data conflicts via a conflict arbitration module;
- computer-executable program code to define hierarchical locks, each lock being associated with a shared resource among available resources;
- computer-executable program code to determine whether a first condition related to a transaction abort is satisfied when retrying the aborted transaction for the program region;
- computer-executable program code to acquire a bottom level lock corresponding to a bottom level resource to execute the program region in the transaction if the first condition is satisfied;
- computer-executable program code to acquire a next level lock corresponding to a next level resource, after releasing the bottom level lock, if a second condition related to a threshold for transaction retries is determined to be satisfied; and
- computer-executable program code to execute the program region without using the transaction if the acquired next level lock is a top level lock corresponding to a top level resource.

23. The computer program product of claim 22, wherein the program instructions further comprise:
- computer-executable program code to end the transaction and release the acquired lock if the top level lock is released; and
- computer-executable program code to release the top level lock upon ending the executing of the program region if the top level lock is acquired.

24. The computer program product of claim 23, wherein the hierarchical locks have one or more intermediate level locks between the top level lock and the bottom level lock, the program instructions comprising:
- computer-executable program code to escalate a current level until reaching the top level where the top level lock is acquired.

* * * * *